United States Patent Office 3,446,600
Patented May 27, 1969

3,446,600
GAS DETECTOR APPARATUS
Karl-August Wächter and Wolfgang Eckstein, Lubeck, Germany, assignors to Otto H. Drager, Lubeck, Germany
Filed Aug. 8, 1966, Ser. No. 571,103
Claims priority, application Germany, Aug. 11, 1965, D 47,941
Int. Cl. G01n *31/22*; F04b *13/00*
U.S. Cl. 23—254                                            10 Claims

ABSTRACT OF THE DISCLOSURE

In an apparatus for the detection of foreign components in gases or air, the gas or air is drawn through a detector tube into a bellows by means of a suction pump in which the suction expansion stroke is spring-actuated and the compression stroke is faster than the expansion stroke.

---

This invention is directed to a gas detector apparatus and in particular to means for drawing gas through a detector tube.

Gas and/or dust detectors and measuring apparatus are used for the detection and measuring of the amount of foreign components in gases or air. One group of such gas detecting apparatus is constructed so that the gas or air to be tested is drawn through a reagent layer containing a detecting reagent for the component part being looked for and with the reagent layer changing color when contacted by the foreign component in the air. This reagent layer is placed in a detector tube and the air to be tested is drawn through the detector tube by means of a manually operated pump. Bellows, membrane or piston pumps are used for both moving the air and measuring the quantity of air that is moved, such quantity being the product of the pump volume and the number of pump strokes. A dust detector apparatus is also known which is constructed according to the same basic principle but in which the dust is retained by a filter and then measured at a later time.

Depending upon the particular type of detector tube being used, up to about fifteen pump strokes are needed with the use of currently available pumps and so that the actual measuring time takes several minutes. These apparatuses have the disadvantage that they are impractical for other types of measuring. When, for example, a large amount of air must be moved to be tested, it is no longer practical to do this by means of a hand pump. Also, it may be necessary that a definite amount of air be tested at intervals covering a long time period and to move the air through the reagent layer by drawing it through the layer. A hand operated pump in such case has the disadvantage in that it wastes the time of a person for operating the pump.

The object of this invention is to avoid the above-mentioned disadvantages and to operate the pump other than manually. In this invention, the pump has a suction expansion stroke produced by spring pressure for drawing a gas to be tested through a reagant layer or a dust filter in a detector tube. The drive for the pump is an electric motor, solenoid, clockwork or internal combustion engine and is used for the compression stroke of the pump and having a return stroke which is faster than the spring actuated expansion stroke of the pump. In this invention, the pump is not only mechanically driven but it is so operated that the spring expansion stroke draws the gas through the tube at the velocity and quantity required for the reaction of the gas with the reagent layer or filter. Consequently, the same detector tubes can be used which have heretofore been used with manually operated pumps.

Broadly, this invention is composed of a bellows, membrane or piston pump having a suction expansion stroke operated by a spring for moving the air with one end of the pump which is movable facing a thrust plate which is mechanically driven.

Again, broadly, the pump itself is the same as the conventionally manually operated pump.

In both cases, the suction expansion stroke of the pump for drawing the air through the detector tube is accomplished independently through the pump by its spring and the compression stroke is again independently applied to the pump.

The means by which the objects of the invention are obtained are described more fully with reference to the accompanying drawings in which.

Figure 1:
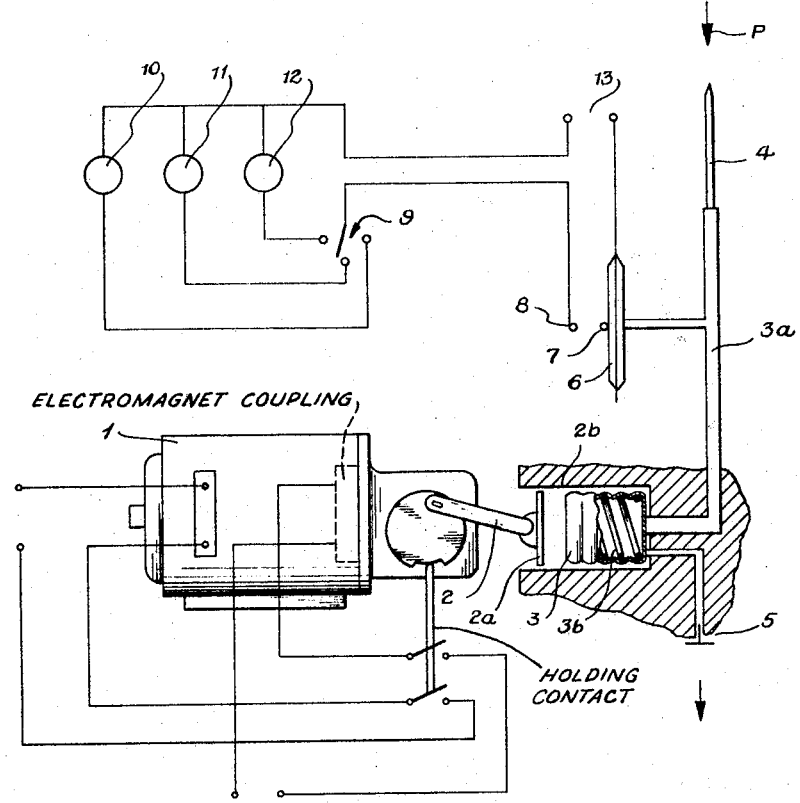
FIGURE 1 is a schematic view showing a pump driven by an electric motor.

As shown in FIGURE 1, the electric motor 1 has a connecting rod 2 going to a pressure element such as a thrust plate 2a. This plate slides in guide rail 2b and faces the movable bottom surface of a spring actuated suction expansion stroke bellows pump 3. A membrane pump, piston pump, or even the movable portion of a manually actuated pump can also be used in place of pump 3. It is only essential that the pump is constructed so that as soon as the pump compression stroke exerted by plate 2a has stopped the pump returns automatically to its starting position, such as a bellows pump having an expansion stroke spring, a rubber ball or the like. Pump 3 is connected by pipe 3a with detector tube 4. As shown, the air to be detected is drawn through tube 4 in the direction of the arrow P by the suction created during the expansion stroke of pump 3.

The exhaust side of pump 3 is through a pipe having a check valve 5. A pressure box such as an aneroid 6 is joined to pipe 3a and carries an electrical contact 7. This is engageable with a contact 8 connected to a multiple switch 9 by means of which an electrical circuit can be completed to either a counter 10 having a line switch, a time clock 11, or a programming switch 12. Each is connected to a source of electricity 13 which feeds a circuit containing the switch contacts 7 and 8.

The connecting circuits between counter 10, clock 11 or programming switch 12 and the motor 1 are not shown.

At the beginning of the gas detecting, the motor 1 is started by means of, for example, the counter 10 having the line switch. The motor drives thrust plate 2a into contact with bellows pump 3 and gives the pump its compression stroke so that the air contained in the pump is exhausted through check valve 5. The speed of the return stroke of plate 2a is faster than the speed with which the bellows is expanded by means of a spring 3b contained therein. The exchange of the bellows draws the air through tube 4 and the velocity determined by the expansion rate of the bellows and its volume. This produces a less than atmospheric pressure in pipe 3a and likewise in aneroid 6. Contacts 7 and 8 are therefore open so that the circuit is broken and counter 10 with its line switch stopped.

The drive shaft of motor 1 has a holding contact, not shown, which is adjusted so that the motor runs until the thrust plate 2a is drawn back to starting position. Inasmuch as counter 10 is stopped, motor 1 also stops. The electric circuit of counter 10 is only energized when the contacts 7 and 8 are closed after pump 3 has completed its suction expansion stroke so that atmospheric pressure again exists in aneroid 6 to start motor 1. This continues as often as it corresponds to the setting of counter 10.

By these means, it is possible to set the desired number of pump strokes for a definite period of time and with the assurance that each stroke draws the required amount of air through the detector tube at the proper velocity.

A time clock 11 or a programming switch 12 can take the place of the counter 10 and either a continuous measurement of the gas extending over a definite time period or several measurements taken at definite time intervals by said time clock or said programming switch.

The detector tube can be located at any desired distance from pump 3 and made portable.

A dust measuring apparatus having a dust collecting filter can be substituted for the detector tube in order to measure the amount of dust in the air.

In the modified form of the invention, a continuously rotating drive mechanism such as an electric motor, an internal combustion motor, a clockwork or the like can be substituted for motor 1 and in which a coupling, preferably electrical, is mounted between the motor and the thrust plate 2a so that the thrust plate is intermittently moved in the compression and expansion strokes. When an electrically actuated coupling is used, it is given a holding contact so that the coupling is only shut off after a complete cycle of the thrust plate.

When an internal combustion engine is used as the driving means, such runs continuously and again is given a coupling between the engine and the thrust plate, preferably electrical, so that the thrust plate is moved through each complete cycle.

Figure 2:
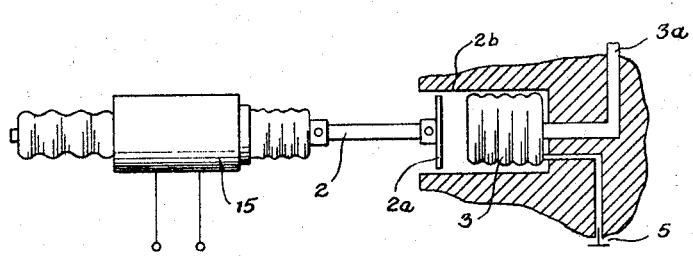
FIGURE 2 is a modified form of a portion of FIGURE 1 showing a solenoid drive for the pump.

The modification of FIGURE 2 differs from FIGURE 1 in that a solenoid 15 is substituted for the motor 1. This solenoid is also controlled by the aneroid 6 as in FIGURE 1. When the solenoid is energized, it pushes its armature against thrust plate 2a in the compression stroke of the pump. A holding contact, not shown, may be mounted on the armature, which contact holds the electric circuit closed only up to the completion of the compression stroke. A spring, not shown, is mounted in the solenoid 15 for returning the armature to its starting position.

Figure 3:
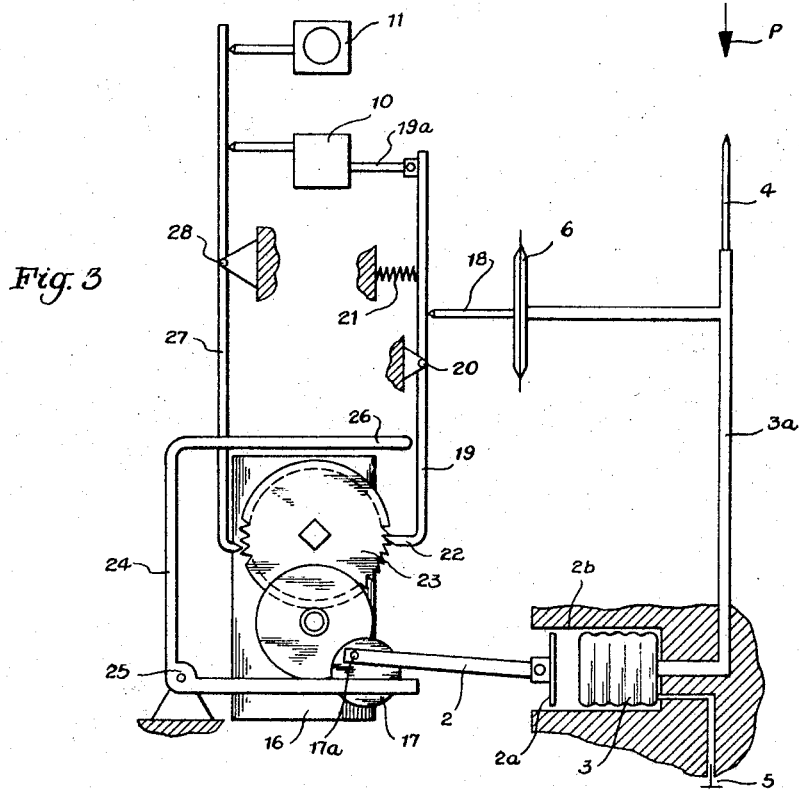
FIGURE 3 is a modification of a clockwork drive for the pump.

In the modification of FIGURE 3, a clockwork 16 is used to drive the disc crank 17 which is joined to the connecting rod 2. The lock, hereinafter described, corresponds to the holding contact used in FIGURES 1 and 2.

The aneroid 6 has a pin 18 which engages and operates a double lever 19. This lever is mounted on the fulcrum 20 and is urged in a clockwise direction by a spring 21. Thus normally lever 19 has its end 22 engaged with the teeth of the locking wheel 23 which is meshed with its driving pinion. As long as atmospheric pressure is in aneroid 6, the end 22 of lever 19 is disengaged from wheel 23 so that the wheel will rotate. However, when less than atmospheric pressure is in aneroid 6, the end 22 engages wheel 23 to stop the clockwork. The escapement means includes a U-shaped double lever 24 mounted on a pivot 25 and oscillated during a portion of the rotation of crank disc 17 by contact with a cam pin 17a. The end 26 of lever 24 strikes lever 19 and forces lever 19 to move counterclockwise for a half turn of crank disc 17 so that end 22 cannot engage locking wheel 23. Consequently, crank disc 17 can complete one rotation and this can be done independently of the time interval during which less than atmospheric pressure is in aneroid 6 during one drive stroke.

A counter 10 or a time clock 11 is used for controlling the clockwork and either actuates a further locking lever 27 mounted on fulcrum 28 and which engages locking wheel 23.

Atmospheric pressure initially exists in aneroid 6. Lever 19 is held by pin 18 so that end 22 is disengaged from wheel 23. On the other hand, lever 27 engages wheel 23 and locks it against rotation. When the mechanism is started by means of counter 10 or clock 11, the lever 27 disengages wheel 23, the clockwork starts and thereby compresses bellows pump 3. When the thrust plate returns to starting position, pump 3 expands and produces a less than atmospheric pressure in aneroid 6. This causes pin 18 to disengage from lever 19 which could now have its end 22 lock wheel 23. It is prevented from doing so by the lever 24 until crank disc 17 has rotated to its starting position. Since the expansion stroke of pump 3 lasts longer than the return movement of crank disc 17, the end 22 engages wheel 23 and stops the clockwork until the bellows pump 3 is fully expanded.

Figure 4:
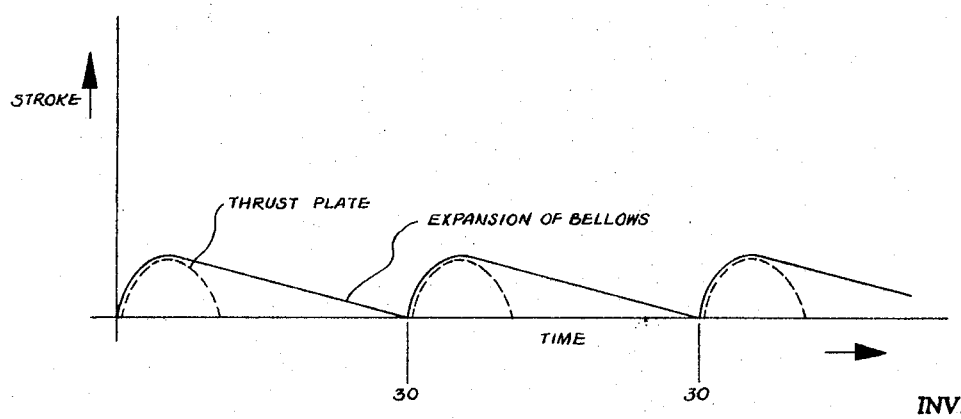
FIGURE 4 is a diagram of the pump movement.

The curve of FIGURE 4 shows the movement of thrust plate 2a in the dashed line and the movement of the pump 3 in a solid line over a period of time. Thrust plate 2a completes the cycle given by the drive mechanism, which movements are separated by intervals of time during which the bellows pump expands to its starting position. Pauses of any time duration can be provided at the point 30 by means of a suitable control.

A further connection 19a between the counter 10 and lever 19 is shown in FIGURE 3 in order to depress the key of the counter.

Having now described the means by which the objects of the invention are obtained,

We claim:

1. An apparatus for drawing gas through a detector tube comprising a detector tube containing a reagent, a bellows pump means having a compression stroke and a spring-actuated suction expansion stroke for drawing gas through said tube at the rate of the expansion stroke speed of the spring, continuously running motor means including a thrust plate for driving the compression stroke at a speed greater than that of the spring-actuated expansion stroke, electrical coupling means connected to said motor means through one cycle in which said thrust plate completes the pump compression stroke and is returned to starting position before the completion of the spring-actuated pump expansion stroke and including holding contact means for turning off said coupling means only after the completion of the pump expansion stroke.

2. An apparatus as in claim 1, said motor means comprising an electric motor having a drive shaft joined to said thrust plate, and holding contact means on said drive shaft and connected to the electric motor circuit for stopping said thrust plate until the spring actuated pump expansion stroke is completed.

3. An apparatus as in claim 1, said motor means further comprising an electric motor joined to said thrust plate, an aneroid communicating with said detector tube, and aneroid switch means in the motor circuit and actuatable by said aneroid for being open during greater than atmospheric pressure produced on the exhaust side of said pump produced by the pump compression stroke and closed during atmospheric pressure on said aneroid after the pump expansion stroke.

4. An apparatus as in claim 1, said motor means further comprising an electric motor joined to said thrust plate, an aneroid communicating with said detector tube, and aneroid switch means in the motor electric circuit and actuatable by said aneroid for being open during the less than atmospheric pressure produced by the suction pump expansion stroke and closed during atmospheric pressure on the pump.

5. An apparatus as in claim 4, further comprising program switch means connected in the motor electric circuit.

6. An apparatus as in claim 5, further comprising counter means having a motor line switch connected in the motor electric circuit.

7. An apparatus as in claim 6, further comprising time clock means connected in the motor electric circuit.

8. An apparatus as in claim 1, said motor means comprising clockwork mechanism means including a locking device and a lock for running the clockwork after the lock is tripped until the thrust plate has returned to starting position.

9. An apparatus as in claim 8, further comprising aneroid means communicating with said detector tube and engageable with said lock for locking said lock on less than atmospheric pressure in said pump and for unlocking said lock during atmospheric pressure in said pump.

10. An apparatus as in claim 8, further comprising aneroid means communicating with said detector tube and engageable with said lock for locking said lock during greater than atmospheric pressure on the exhaust side of the pump and for unlocking said lock during atmospheric pressure on said exhaust side.

References Cited

UNITED STATES PATENTS

| 2,373,113 | 4/1945 | Francis | 23—254 |
| 2,452,143 | 10/1948 | Pellettere | 73—421.5 |
| 2,801,905 | 8/1957 | Bonner. | |

MORRIS O. WOLK, *Primary Examiner.*

R. M. REESE, *Assistant Examiner.*

U.S. Cl. X.R.

73—421.5